(12) United States Patent
da Veiga et al.

(10) Patent No.: US 9,645,397 B2
(45) Date of Patent: May 9, 2017

(54) USE OF SURFACE RECONSTRUCTION DATA TO IDENTIFY REAL WORLD FLOOR

(71) Applicant: Microsoft Technology Licensing, LLC, Redmond, WA (US)

(72) Inventors: Alexandre da Veiga, Bellevue, WA (US); Ben Sugden, Redmond, WA (US); Tom Salter, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/697,227

(22) Filed: Apr. 27, 2015

(65) Prior Publication Data

US 2016/0027217 A1 Jan. 28, 2016

Related U.S. Application Data

(60) Provisional application No. 62/029,351, filed on Jul. 25, 2014.

(51) Int. Cl.
*G02B 27/01* (2006.01)
*G06F 3/01* (2006.01)
(Continued)

(52) U.S. Cl.
CPC ....... *G02B 27/0172* (2013.01); *G02B 27/017* (2013.01); *G06F 3/012* (2013.01);
(Continued)

(58) Field of Classification Search
CPC .............. G02B 27/0172; G02B 27/017; G02B 2027/0178; G02B 2027/0138;
(Continued)

(56) References Cited

U.S. PATENT DOCUMENTS 5,819,206 A 10/1998 Horton et al.
5,877,748 A 3/1999 Redlich
(Continued)

FOREIGN PATENT DOCUMENTS

CN 101540020 B 9/2012
CN 103761085 A 4/2014
(Continued)

OTHER PUBLICATIONS

"International Search Report and Written Opinion Issued in PCT Patent Application No. PCT/US2015/041861", Mailed Date: Oct. 30, 2015, (11 pages total).
(Continued)

*Primary Examiner* — Sahlu Okebato
(74) *Attorney, Agent, or Firm* — Mark K. Young; Mayer & Williams PC

(57) ABSTRACT

In a virtual reality or mixed reality environment, an HMD device is configured to use surface reconstruction data points obtained with a sensor package to identify a location of a floor of a real world environment in which the device operates by sorting the data points by height into respective buckets where each bucket holds a different range of heights. A bucket having the greatest number of data points that are below the height of a user of the HMD device is used to identify the height of the real world floor, for example, by calculating an average of height values of data points in that bucket. A floor for the virtual reality environment may then be aligned to the identified height of the real world floor.

20 Claims, 15 Drawing Sheets

(51) Int. Cl.
*H04N 13/02* (2006.01)
*G06T 7/73* (2017.01)
*H04N 13/00* (2006.01)

(52) U.S. Cl.
CPC ........... *G06T 7/73* (2017.01); *H04N 13/0278* (2013.01); *G02B 2027/0138* (2013.01); *G02B 2027/0178* (2013.01); *G06T 2207/10016* (2013.01); *G06T 2207/10028* (2013.01); *H04N 13/0203* (2013.01); *H04N 2013/0081* (2013.01)

(58) Field of Classification Search
CPC  G06T 2207/10016; G06T 2207/10028; H04N 13/0278; H04N 2013/0081
See application file for complete search history.

(56) References Cited

U.S. PATENT DOCUMENTS

| | | |
|---|---|---|
| 6,012,926 A | 1/2000 | Hodges et al. |
| 6,023,275 A | 2/2000 | Horvitz et al. |
| 6,329,986 B1 | 12/2001 | Cheng |
| 6,396,495 B1 | 5/2002 | Parghi et al. |
| 6,396,497 B1 | 5/2002 | Reichlen |
| 6,529,331 B2 | 3/2003 | Massof et al. |
| 6,552,698 B1 | 4/2003 | Walker |
| 6,741,241 B1 | 5/2004 | Jaubert et al. |
| 6,898,266 B2 | 5/2005 | Griffith |
| 7,274,380 B2 | 9/2007 | Navab et al. |
| 7,386,799 B1 | 6/2008 | Clanton et al. |
| 7,400,322 B1 | 7/2008 | Urbach |
| 7,486,817 B2 | 2/2009 | Yanagawa et al. |
| 7,538,775 B2 | 5/2009 | Ishihara |
| 7,542,210 B2 | 6/2009 | Chirieleison, Sr. |
| 7,557,774 B2 | 7/2009 | Baudisch et al. |
| 8,049,750 B2 | 11/2011 | Gloudemans et al. |
| 8,266,536 B2 | 9/2012 | Roberts et al. |
| 8,405,680 B1 | 3/2013 | Cardoso Lopes et al. |
| 8,576,247 B2 | 11/2013 | Avkarogullari et al. |
| 8,611,015 B2 | 12/2013 | Wheeler et al. |
| 8,751,969 B2 | 6/2014 | Matsuda et al. |
| 8,754,931 B2 | 6/2014 | Gassel et al. |
| 8,780,014 B2 | 7/2014 | Border et al. |
| 8,793,620 B2 | 7/2014 | Stafford |
| 9,443,352 B1 | 9/2016 | Glover |
| 2001/0035845 A1 | 11/2001 | Zwern |
| 2002/0044152 A1 | 4/2002 | Abbott et al. |
| 2002/0154214 A1 | 10/2002 | Scallie et al. |
| 2002/0181115 A1 | 12/2002 | Massof et al. |
| 2003/0091226 A1 | 5/2003 | Cahill |
| 2005/0024388 A1 | 2/2005 | Takemoto |
| 2006/0050070 A1 | 3/2006 | Matsui |
| 2006/0092178 A1 | 5/2006 | Tanguay, Jr. et al. |
| 2008/0174659 A1 | 7/2008 | McDowall |
| 2008/0195315 A1 | 8/2008 | Hu |
| 2009/0167785 A1 | 7/2009 | Wong |
| 2010/0208057 A1 | 8/2010 | Meier |
| 2010/0226017 A1 | 9/2010 | Spaller |
| 2010/0315413 A1 | 12/2010 | Izadi et al. |
| 2011/0029903 A1 | 2/2011 | Schooleman et al. |
| 2011/0043627 A1 | 2/2011 | Werling et al. |
| 2011/0140994 A1 | 6/2011 | Noma |
| 2012/0052917 A1 | 3/2012 | Kim |
| 2012/0056876 A1 | 3/2012 | Lee et al. |
| 2012/0068913 A1 | 3/2012 | Bar-Zeev et al. |
| 2012/0092328 A1 | 4/2012 | Flaks |
| 2012/0113092 A1 | 5/2012 | Bar-Zeev et al. |
| 2012/0237116 A1 | 9/2012 | Xiao |
| 2012/0249741 A1 | 10/2012 | Maciocci |
| 2012/0309522 A1 | 12/2012 | Westlund et al. |
| 2012/0313839 A1 | 12/2012 | Smithwick |
| 2012/0327116 A1 | 12/2012 | Liu et al. |
| 2013/0044128 A1 | 2/2013 | Liu et al. |
| 2013/0050258 A1 | 2/2013 | Liu et al. |
| 2013/0050432 A1 | 2/2013 | Perez et al. |
| 2013/0083007 A1 | 4/2013 | Geisner et al. |
| 2013/0083018 A1 | 4/2013 | Geisner |
| 2013/0088413 A1 | 4/2013 | Raffle et al. |
| 2013/0093789 A1 | 4/2013 | Liu et al. |
| 2013/0127980 A1 | 5/2013 | Haddick |
| 2013/0137076 A1 | 5/2013 | Perez et al. |
| 2013/0141419 A1 | 6/2013 | Mount |
| 2013/0147686 A1 | 6/2013 | Clavin et al. |
| 2013/0194259 A1 | 8/2013 | Bennett et al. |
| 2013/0257751 A1 | 10/2013 | Stafford |
| 2013/0287290 A1 | 10/2013 | Owechko |
| 2013/0300637 A1 | 11/2013 | Smits et al. |
| 2013/0307855 A1 | 11/2013 | Lamb et al. |
| 2013/0326364 A1 | 12/2013 | Latta et al. |
| 2013/0328927 A1 | 12/2013 | Mount et al. |
| 2013/0335303 A1 | 12/2013 | Maciocci et al. |
| 2013/0336629 A1 | 12/2013 | Mulholland et al. |
| 2013/0342564 A1 | 12/2013 | Kinnebrew et al. |
| 2013/0342570 A1 | 12/2013 | Kinnebrew et al. |
| 2014/0002444 A1 | 1/2014 | Bennett et al. |
| 2014/0049559 A1 | 2/2014 | Fleck et al. |
| 2014/0104142 A1 | 4/2014 | Bickerstaff et al. |
| 2014/0132484 A1 | 5/2014 | Pandey |
| 2014/0132715 A1 | 5/2014 | Raghoebardayal |
| 2014/0140579 A1* | 5/2014 | Takemoto ............... G01C 3/08 382/106 |
| 2014/0168264 A1* | 6/2014 | Harrison ............ G02B 27/0176 345/633 |
| 2014/0176530 A1 | 6/2014 | Path re |
| 2014/0184550 A1 | 7/2014 | Hennessey et al. |
| 2014/0204117 A1 | 7/2014 | Kinnebrew et al. |
| 2014/0221090 A1 | 8/2014 | Mutschler et al. |
| 2014/0240351 A1 | 8/2014 | Scavezze et al. |
| 2014/0253605 A1 | 9/2014 | Border et al. |
| 2014/0267400 A1 | 9/2014 | Mabbutt |
| 2014/0363073 A1 | 12/2014 | Shirakyan |
| 2014/0372957 A1 | 12/2014 | Keane et al. |
| 2015/0143459 A1 | 5/2015 | Molnar |
| 2015/0178956 A1* | 6/2015 | Davis .................... G06T 11/001 345/582 |
| 2015/0205106 A1 | 7/2015 | Norden |
| 2015/0261293 A1 | 9/2015 | Wilairat |

FOREIGN PATENT DOCUMENTS

| | | |
|---|---|---|
| EP | 1521482 A2 | 4/2005 |
| EP | 2164045 A2 | 3/2010 |
| WO | 2009128781 A1 | 10/2009 |
| WO | 2013029097 A2 | 3/2013 |
| WO | 2013052855 A2 | 4/2013 |
| WO | 2013057649 A1 | 4/2013 |
| WO | 2013085193 A1 | 6/2013 |
| WO | 2013155217 A1 | 10/2013 |
| WO | 2014188798 A1 | 11/2014 |
| WO | 2015108887 A1 | 7/2015 |

OTHER PUBLICATIONS

"International Search Report and Written Opinion Issued in PCT Application No. PCT/US2015/041867", Mailed Date: Nov. 25, 2015, (11 Pages total).

"International Search Report & Written Opinion Received for PCT Application No. PCT/US2015/041863",Mailed Date: Nov. 16, 2015, (12 Pages total).

"International Search Report & Written Opinion Issued in PCT Application No. PCT/US2015/041862", Mailed Date: Nov. 16, 2015, (11 Pages total).

Nilsen, et al., "Tankwar—Tabletop War Gaming in Augmented Reality", In 2nd International Workshop on Pervasive Gaming Applications, PerGames. vol. 5, Retrieved on: Sep. 12, 2014, 5 pages.

Murray, et al., "Comparison of Head Gaze and Head and Eye Gaze within an Immersive Environment", In Tenth IEEE International Symposium on Distributed Simulation and Real-Time Applications, Oct. 2, 2006, 7 pages.

(56) References Cited

OTHER PUBLICATIONS

Steptoe, et al., "Eye Tracking for Avatar Eye Gaze Control during Object-Focused Multiparty Interaction in Immersive Collaborative Virtual Environments", In IEEE Virtual Reality Conference, Mar. 14, 2009, 8 pages.

Suma, et al., "Sharing Space in Mixed and Virtual Reality Environments Using a Low-Cost Depth Sensor", In Proceedings of IEEE International Symposium on Virtual Innovation, Mar. 19, 2011, 2 pages.

Ponto, et al., "Perceptual Calibration for Immersive Display Environments", In IEEE Transactions on Visualization and Computer Graphics, vol. 19, Issue 4, Apr. 2013, pp. 691-700, 10 pages.

Li, et al., "On the Anisotropy of Perceived Ground Extents and the Interpretation of Walked Distance as a Measure of Perception", In Journal of Experimental Psychology: Human Perception and Performance, vol. 39, Issue 2, Apr. 2013, 33 pages.

Li, et al., "The Underestimation of Egocentric Distance: Evidence from Frontal Matching Tasks", In Proceedings of Attention, Perception & Psychophysics, Oct. 2011, 15 pages.

Howe, Bo, "Holographic Computer Monitor", Published on: Aug. 18, 2010, Available at: www.youtube.com/watch?v=tHIxj7fY-38, 2 pages.

Angley, Natalie, "Glasses to make you a real-life Tony Stark", Published on: Oct. 31, 2013, Available at: http://edition.cnn.com/2013/10/31/tech/innovation/meta-augmented-reality-glasses/, 4 pages.

Hiner, Jason, "Future iPhone concept: Laser keyboard and holographic display", Published on: Aug. 31, 2011, Available at: http://www.techrepublic.com/blog/tech-sanity-check/future-iphone-concept-laser-keyboard-and-holographic-display/, 6 pages.

Chen, Jian, "A Virtual Environment System for the Comparative Study of Dome and HMD", In Master Thesis, Department of Computer Science, University of Houston, May 2002, 104 pages.

McCarthy, Mike, "HP intros new versions of its mobile and tower workstations", Retrieved on: Sep. 11, 2014, Available at: http://postperspective.com/hp-intros-new-versions-pro-offerings/, 5 pages.

Nakashima, et al., "A 2D-3D Integrated Environment for Cooperative Work", In Proceedings of the Virtual Reality Software and Technology, Nov. 7, 2005, 7 pages.

Pierce, et al., "Image Plane Interaction Techniques in 3D Immersive Environments", In Proceedings of the symposium on Interactive 3D graphics, Apr. 30, 1997, 10 pages.

Regenbrecht, et al., "Interaction in a Collaborative Augmented Reality Environment", In Proceedings of CHI Extended Abstracts on Human Factors in Computing Systems, Apr. 20, 2002, 2 pages.

"Touchscreen interface for seamless data transfer between the real and virtual worlds", Published on: Apr. 15, 2013, Available at: http://www.diginfo.tv/v/13-0025-r-en.php, 8 pages.

Urban, John, "Five Free Tools for Multi-Monitor Computer Set-Ups", Published on: Sep. 16, 2009, Available at: http://sixrevisions.com/tools/five-free-tools-for-multi-monitor-computer-set-ups/, 17 pages.

Steinicke, et al., "Natural Perspective Projections for Head-Mounted Displays", In IEEE Transactions on Visualization and Computer Graphics, Jul. 2011, 12 pages.

Hogue, David, "What Are Index and Alpha Transparency?", Published on: Mar. 3, 2011, Available at: http://www.idux.com/2011/02/27/what-are-index-and-alpha-transparency/, 14 pages.

Jimenez, et al., "Gaze-based Interaction for Virtual Environments", In Journal of Universal Computer Science, vol. 14, Issue 19, Nov. 2008, 14 pages.

Kinoshita, et al., "A Fast and Robust 3D Head Pose and Gaze Estimation System", In 8th IEEE International Conference onAutomatic Face & Gesture Recognition, Sep. 17, 2008, 2 pages.

Peterson, et al., "Evaluation of Alternative Label Placement Techniques in Dynamic Virtual Environments", In Proceedings of the 10th International Symposium on Smart Graphics, May 22, 2009, 7 pages.

Kuhl, et al., "HMD Calibration and its Effects on Distance Judgments", In Proceedings of the 5th symposium on Applied perception in graphics and visualization, Aug. 9, 2008, 24 pages.

Kim. et al., "3D Reconstruction of Stereo Images for Interaction between Real and Virtual Worlds", In Proceedings of the Second IEEE and ACM International Symposium on Mixed and Augmented Reality, Oct. 7, 2003, 9 pages.

Amar, et al., "Synthesizing Reality for Realistic Physical Behavior of Virtual Objects in Augmented Reality Applications for Smart-Phones", In Proceedings of IEEE Virtual Reality, Mar. 16, 2013, pp. 123-124, 2 pages.

Lavoie, et al., "Constructing 3D Virtual Reality Objects from 2D Images of Real Objects Using NURBS", In Proceedings of IEEE International Conference on Virtual Environments, Human-Computer Interfaces, and Measurement Systems Ostuni, Jun. 25, 2007, 8 pages.

Nóbrega, et al., "Magnetic Augmented Reality: Virtual Objects in Your Space", In Proceedings of the International Working Conference on Advanced Visual Interfaces, May 21, 2012, pp. 332-335, 4 pages.

Izadi, et al., "KinectFusion: Real-time 3D Reconstruction and Interaction Using a Moving Depth Camera", In Proceedings of the 24th annual ACM symposium on User interface software and technology, Oct. 16, 2011, 10 pages.

Kalkofen, et al., "Visualization Techniques for Augmented Reality", In Proceedings of Handbook of Augmented Reality, Jul. 13, 2011, pp. 65-98, 34 pages.

Maimone, et al., "Computational Augmented Reality Eyeglasses", In Proceedings of IEEE International Symposium on Mixed and Augmented Reality, Oct. 1, 2013, 10 pages.

"Virtual Reality (VR) and Mixed Reality (MR) technologies", Retrieved on: Sep. 12, 2014, Available at: http://www.vr-hyperspace.eu/about-vr-hyperspace/technology/77-virtual-reality-vr-and-mixed-reality-mr-technologies (5 pages total).

"International Preliminary Report on Patentability Issued in PCT Application No. PCT/US2015/041868", Mailed Date: Oct. 28, 2015, (10 Pages total).

"International Preliminary Report on Patentability Issued in PCT Application No. PCT/US2015/041864", Mailed Date: Oct. 26, 2015, (11 Pages total).

"Second Written Opinion Issued in PCT Application No. PCT/US2015/041866", Mailed Date: Jun. 27, 2016, 7 Pages.

"Second Written Opinion Issued in PCT Application No. PCT/US2015/041865", Mailed Date: Jun. 15, 2016, 8 Pages.

"Second Written Opinion Issued in PCT Application No. PCT/US2015/041868", Mailed Date: Jul. 1, 2016, (6 Pages).

"Second Written Opinion Issued in PCT Application No. PCT/US2015/041862", Mailed Date: Jun. 13, 2016, 5 Pages.

"Second Written Opinion Issued in PCT Application No. PCT/US2015/041863", Mailed Date: Jun. 15, 2016, 7 Pages.

"Second Written Opinion Issued in PCT Application No. PCT/US2015/041861", Mailed Date: Jun. 20, 2016, 6 Pages.

Duchowski, Andrew, "Chapter 7—Head-Mounted System Software Development", In Book Eye Tracking Methodology, Theory and Practice, Part 2, Jan. 1, 2007, pp. 69-86. (18 pages total).

"International Preliminary Report on Patentability Issued in PCT Application No. PCT/US2015/041868", Mailed Date: Oct. 13, 2016, 8 Pages.

"International Preliminary Report on Patentability Issued in PCT Application No. PCT/US2015/041863", Mailed Date: Oct. 13, 2016, 8 Pages.

"International Preliminary Report on Patentability Issued in PCT Application No. PCT/US2015/041862", Mailed Date: Oct. 13, 2016, 6 Pages.

"International Preliminary Report on Patentability Issued in PCT Application No. PCT/US2015/041861", Mailed Date: Oct. 13, 2016, 7 Pages.

"International Preliminary Report on Patentability Issued in PCT Application No. PCT/US2015/041865", Mailed Date: Oct. 19, 2016, 7 Pages.

"International Preliminary Report on Patentability Issued in PCT Application No. PCT/US2015/041866", Mailed Date: Oct. 27, 2016, 9 Pages.

(56) References Cited

OTHER PUBLICATIONS

"International Search Report and Written Opinion Issued in PCT Application No. PCT/US2015/041865", Mailed Date: Jan. 25, 2016, 12 Pages.

"International Search Report & Written Opinion Issued in PCT Patent Application No. PCT/US2015/041866", Mailed Date: Nov. 27, 2015, 12 Pages.

"Gaze Awareness for Videoconferencing: A Software Approach" (by Jim Gemmell and Kentaro Toyama, Microsoft; C. Lawrence Zitnick and Thomas Kang, Carnegie Mellon University; Steven Seitz, University of Washington, in 1070-986X/00/$10.00 © 2000 IEEE) (10 pages total).

* cited by examiner

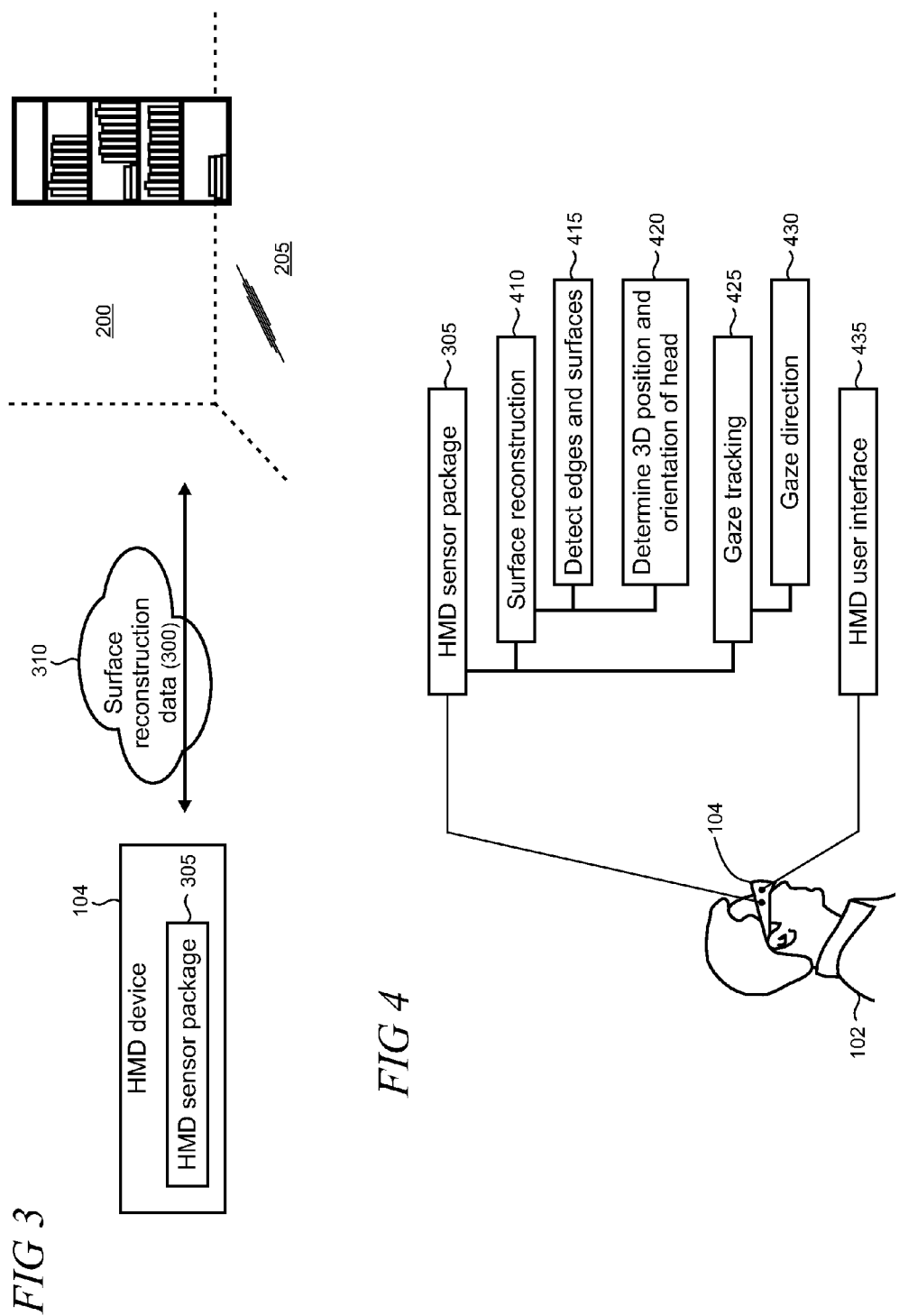

USE OF SURFACE RECONSTRUCTION DATA TO IDENTIFY REAL WORLD FLOOR

STATEMENT OF RELATED APPLICATIONS

This application claims benefit and priority to U.S. Provisional Application Ser. No. 62/029,351 filed Jul. 25, 2014, entitled "Head Mounted Display Experiences" which is incorporated herein by reference in its entirety.

BACKGROUND

Virtual reality computing devices, such as head mounted display (HMD) systems and handheld mobile devices (e.g. smart phones, tablet computers, etc.), may be configured to display a virtual reality environment to a user in the field of view of the user and/or a field of view of a camera of the device. Similarly, a mobile device may display such information using a camera viewfinder window.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

In a virtual reality or mixed reality environment, an HMD device is configured to use surface reconstruction data points obtained with a sensor package to identify a location of a floor of a real world environment in which the device operates by sorting the data points by height into respective buckets where each bucket holds a different range of heights. A bucket having the greatest number of data points that are below the height of a user of the HMD device is used to identify the height of the real world floor, for example, by calculating an average of height values of data points in that bucket. A floor for the virtual reality environment may then be aligned to the identified height of the real world floor.

In an alternative embodiment, the HMD device is configured to generate a mesh of a physical environment having vertices and faces from a point cloud of surface reconstruction data. The floor of the physical environment is established at the vertex in the mesh having a height that is lowest relative to the HMD device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

FIG. 3 depicts surface reconstruction data associated with real world objects being captured by an HMD device;

FIG. 4 shows a block diagram of an illustrative surface reconstruction pipeline;

Like reference numerals indicate like elements in the drawings. Elements are not drawn to scale unless otherwise indicated.

DETAILED DESCRIPTION

Figure 1:
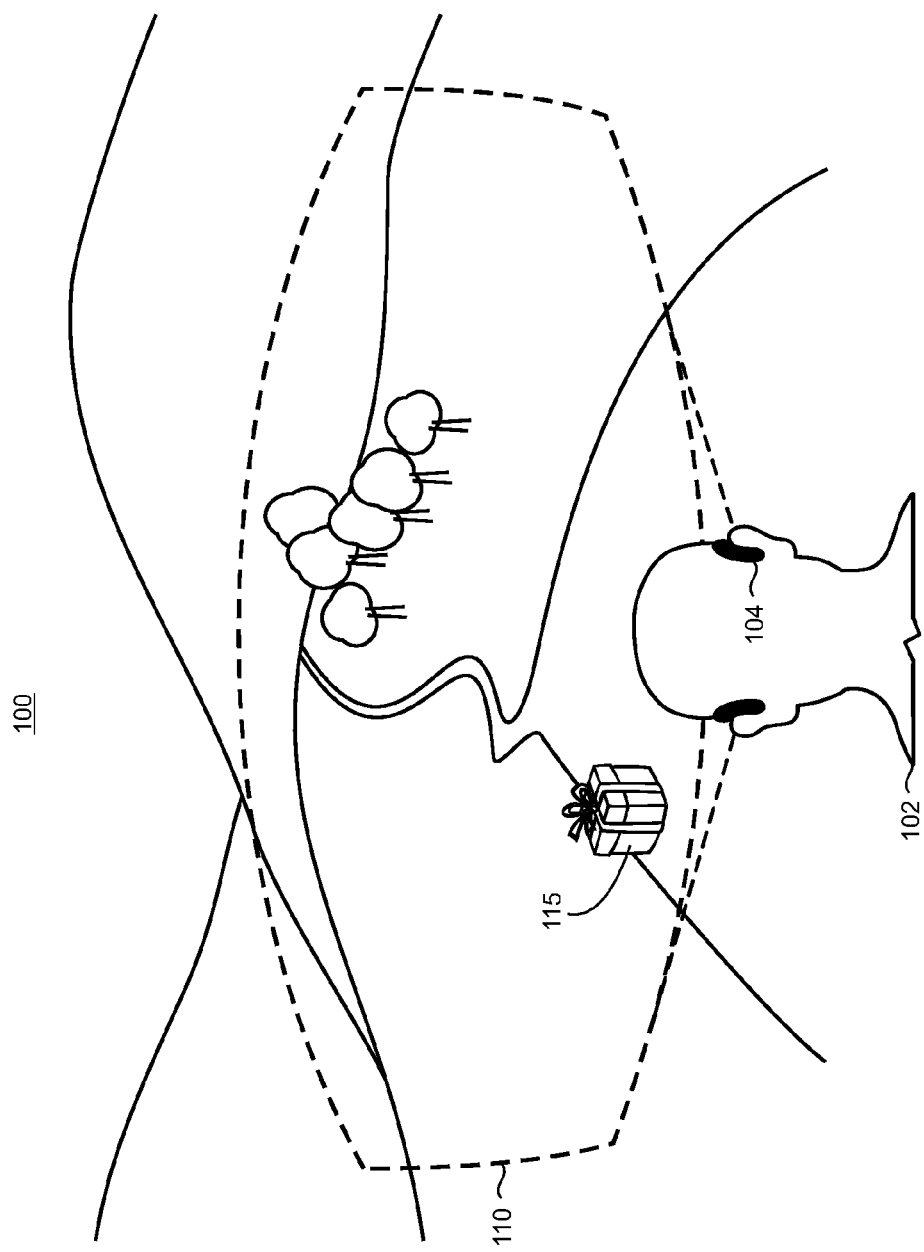
FIG. 1 shows an illustrative virtual reality environment, a portion of which is rendered within the view of a user of an HMD device.

Users can typically explore, navigate, and move within a virtual reality environment rendered by an HMD device by moving (e.g., through some form of locomotion) within a corresponding real world, physical environment. In an illustrative example, as shown in FIG. 1, a user 102 can employ an HMD device 104 to experience a virtual reality environment 100 that is rendered visually and may include audio and/or tactile/haptic sensations in some implementations. In this particular non-limiting example, the virtual reality environment 100 includes a virtual outdoor landscape with rolling, undulating, and hilly terrain having varying virtual elevations. Various virtual objects, as representatively indicated by reference numeral 115, can be located in the virtual world and the user can typically interact with the virtual objects in many implementations. As the user changes the position or orientation of his head and/or moves within the real world environment, his view of the virtual reality environment can change. The field of view (represented by the dashed area 110 in FIG. 1) can be sized and shaped and other characteristics of the device can be controlled to make the HMD device experience visually immersive to provide the user with a strong sense of presence in the virtual reality environment. While a virtual reality environment is shown and described herein, the present use of surface reconstruction data to identify a real world floor can also be applicable to mixed reality environments and scenarios in some cases.

Figure 2:
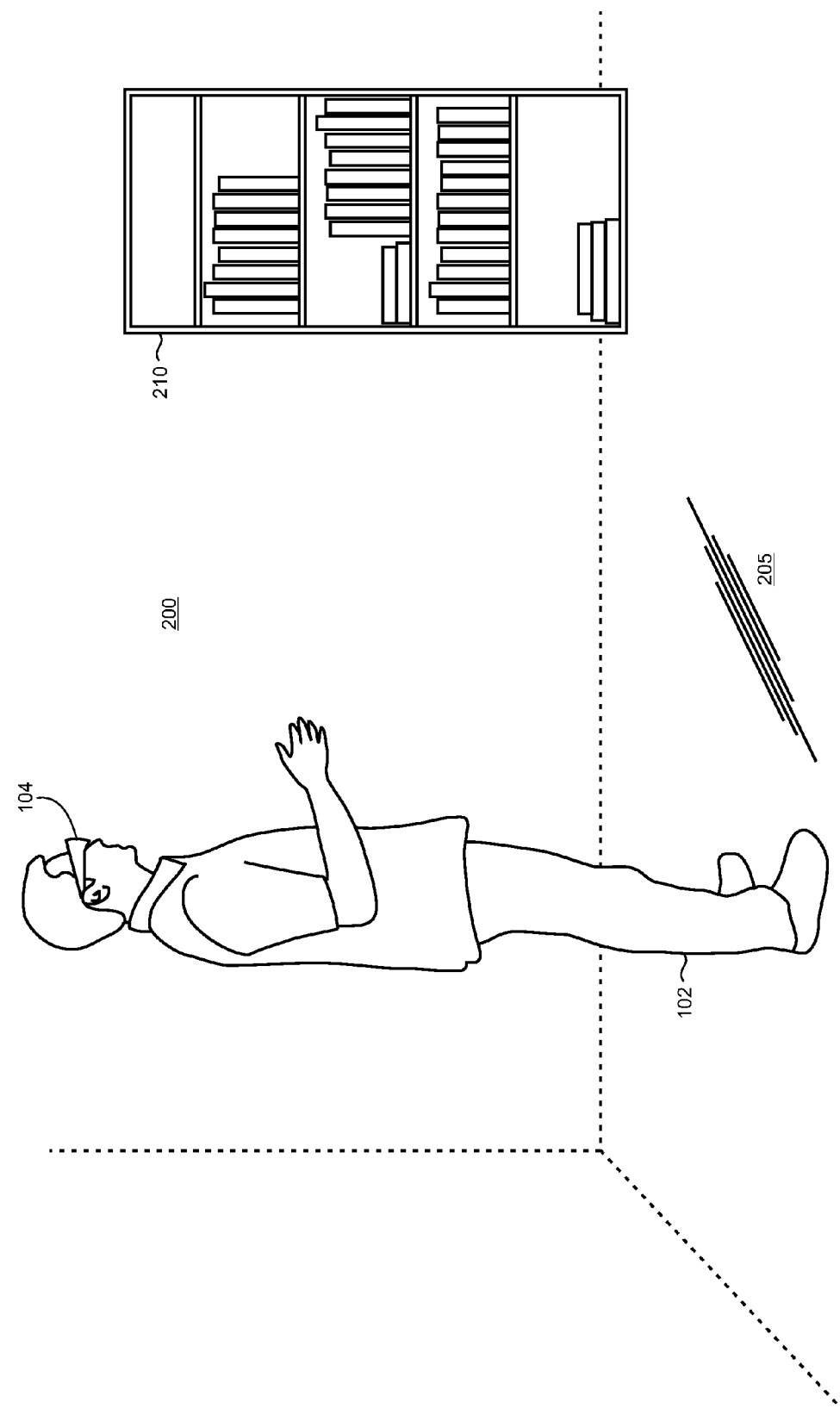
FIG. 2 shows an illustrative real world environment in which a user of an HMD device is located.

As shown in FIG. 2 when using the HMD device 104, the user 102 typically occupies a physical, real world environment 200 that has a floor 205 and may include various real world objects as representatively indicated by reference numeral 210. The present HMD device 104 may be configured to automatically identify the location of the real world floor 205 when the user is engaged in a virtual reality environment. As shown in FIG. 3, the device is configured to obtain surface reconstruction data 300 by using an integrated sensor package 305 to sense the user's position within the physical environment 200 including the height of the HMD device and user's head from the real world floor 205. The sensor package, as described in more detail below, can include a depth sensor or depth-sensing camera system. In alternative implementations, depth data can be derived using suitable stereoscopic image analysis techniques. The surface reconstruction data 300 can be used to generate a point cloud 310.

As shown in FIG. 4, the sensor package 305 can support various functionalities including surface reconstruction 410. Surface reconstruction may be utilized, for example, to detect edges and surfaces 415 and for head tracking to determine the 3D (three-dimensional) position and orientation 420 of the user's head within the physical real world environment 200. The sensor package can also support gaze tracking 425 to ascertain a direction of the user's gaze 430 which may be used along with the head position and orientation data in some implementations. The HMD device 104 may further be configured to expose a user interface (UI) 435 that can expose system messages, prompts, and the like as well as user controls (not shown) in some cases.

Figure 5:
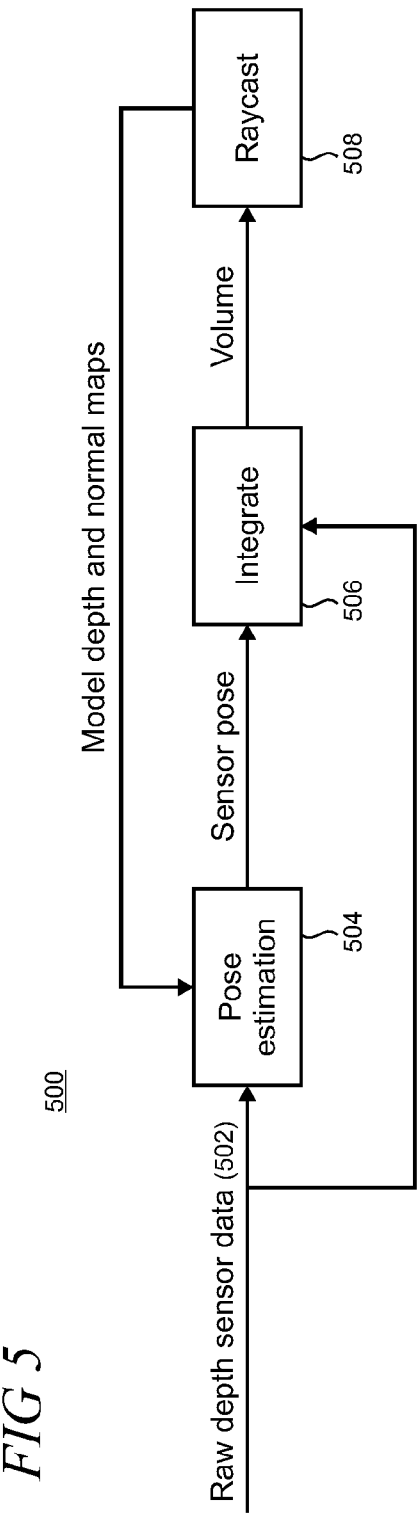
FIG. 5 shows a block diagram of an illustrative surface reconstruction pipeline.

FIG. 5 shows an illustrative surface reconstruction data pipeline 500 for obtaining surface reconstruction data for the real world environment 200. It is emphasized that the disclosed technique is illustrative and that other techniques and methodologies may be utilized depending on the requirements of a particular implementation. Raw depth sensor data 502 is input into a 3D (three-dimensional) pose estimate of the sensor (block 504). Sensor pose tracking can be achieved, for example, using ICP (iterative closest point) alignment between the predicted surface and current sensor measurement. Each depth measurement of the sensor can be integrated (block 506) into a volumetric representation using, for example, surfaces encoded as a signed distance field (SDF). Using a loop, the SDF is raycast (block 508) into the estimated frame to provide a dense surface prediction to which the depth map is aligned. Thus, when the user 102 looks around the virtual world, surface reconstruction data associated with the real world environment 200 can be collected and analyzed to determine the user's head position and orientation within the environment including its height from the floor.

Figure 6:
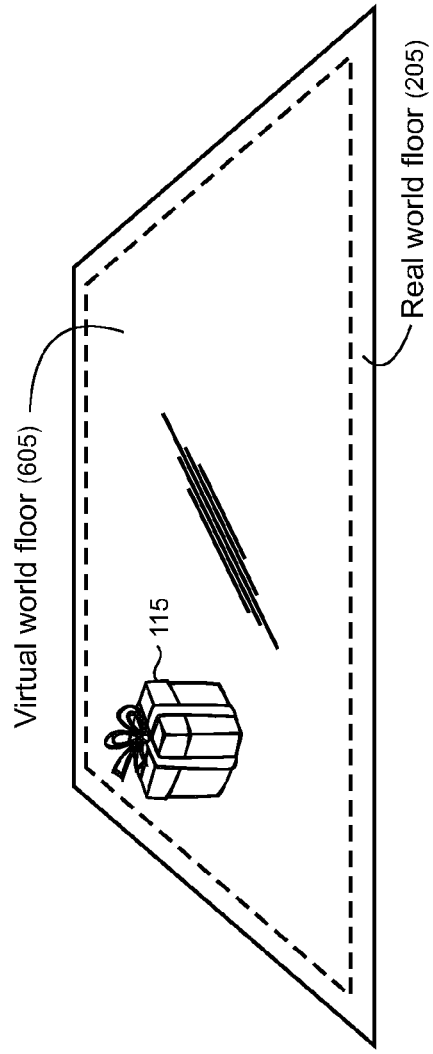
FIG. 6 shows an illustrative example of a virtual floor and a virtual object in alignment with the real world floor.

FIG. 6 shows that the virtual world floor 605 or ground can be aligned with the real world floor 205 when applying surface reconstruction data to identify the real world floor. Virtual objects 115 can also be aligned with the real world floor 205, as shown.

Figure 7:
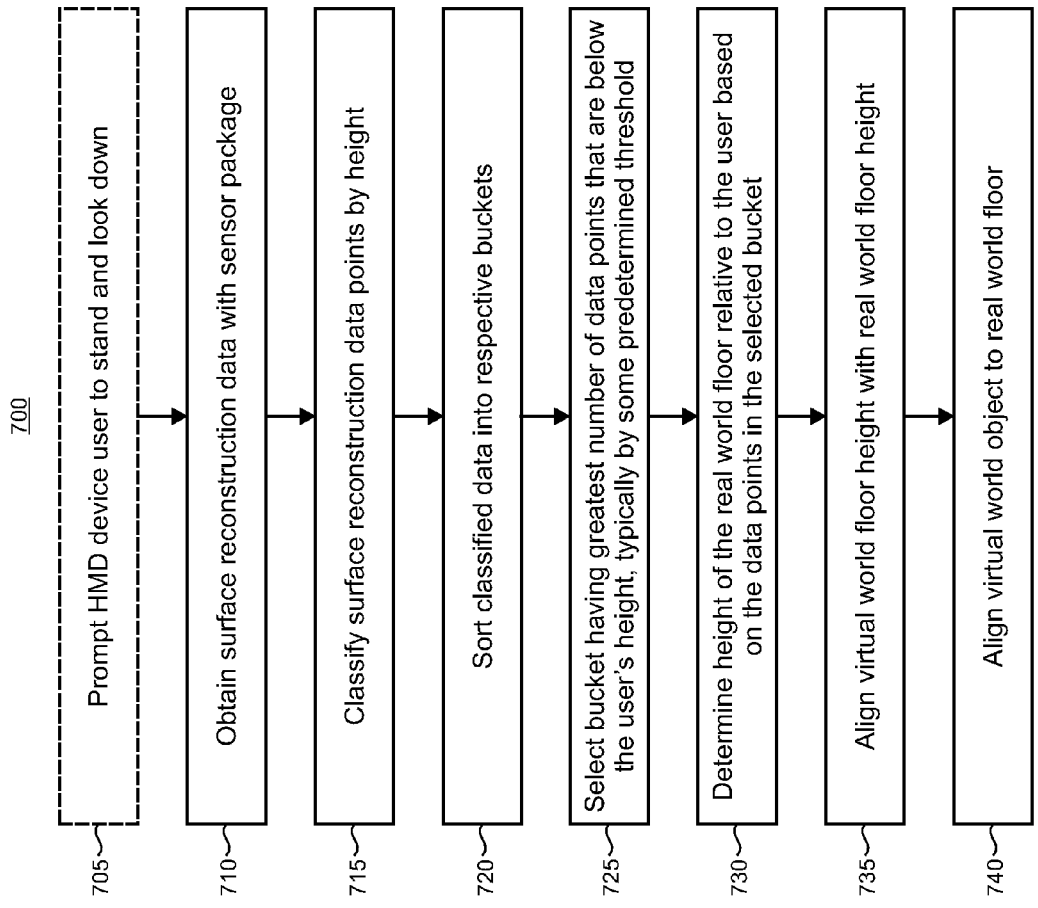
FIGS. 7, 8, and 9 are flowcharts of illustrative methods that may be performed using an HMD device.
Figure 8:
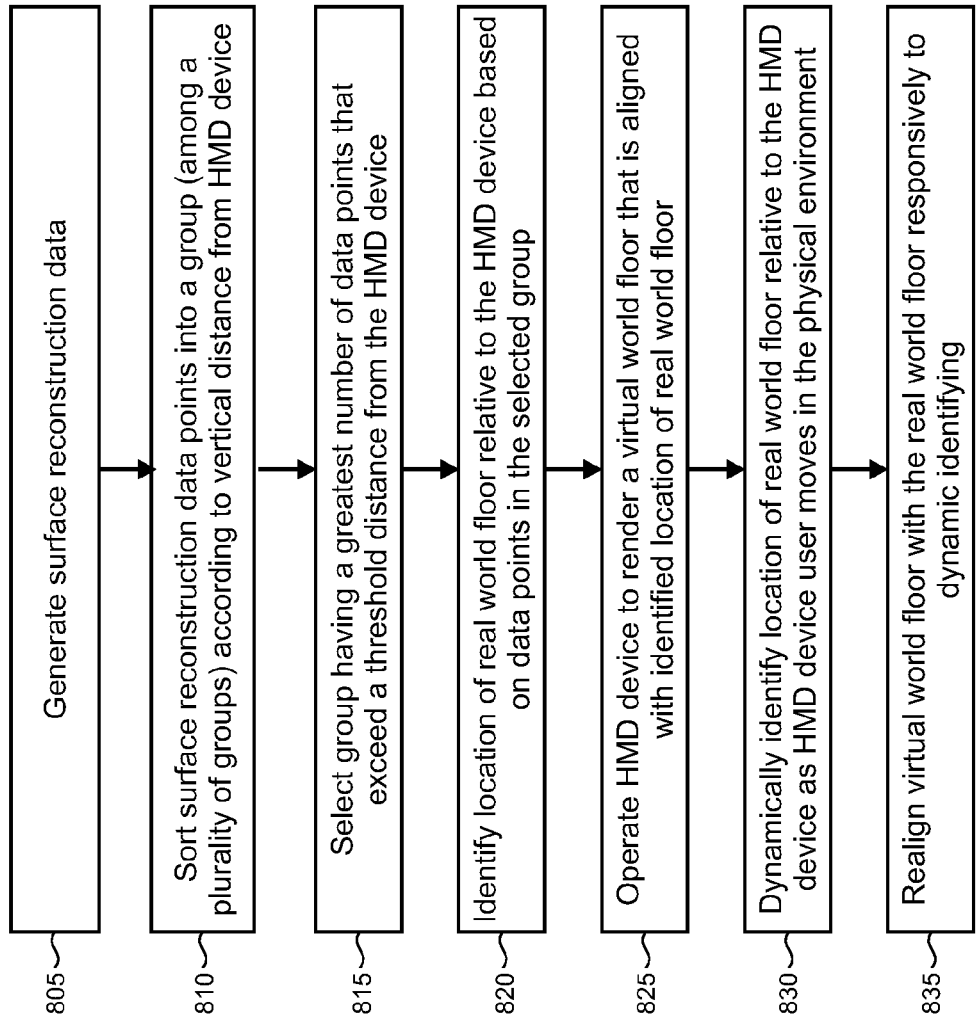
Figure 9:
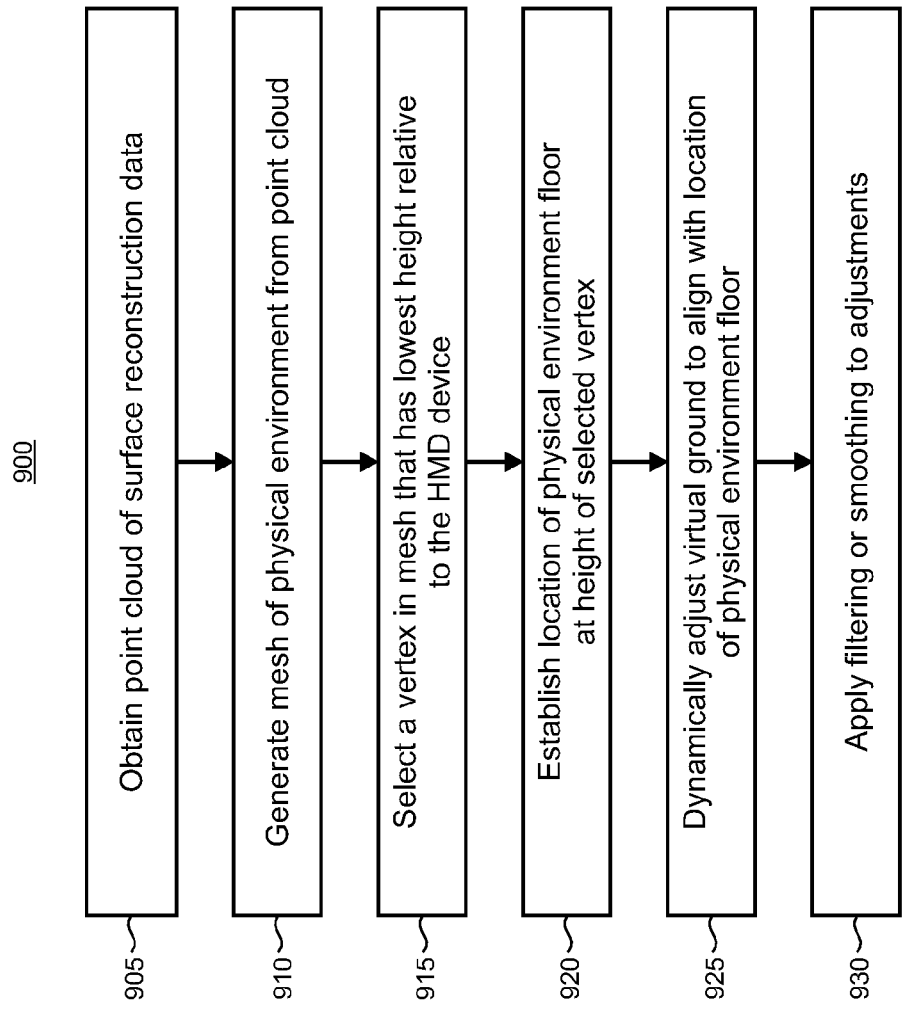

FIGS. 7, 8, and 9 are flowcharts of illustrative methods. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

FIG. 7 is a flowchart of an illustrative method 700 that may be performed using the HMD device 104. In step 705, which is optionally utilized as indicated by the dashed rectangle, the HMD device may prompt the user through a user interface (e.g., UI 435) to stand and look down which may increase accuracy in some implementations. In step 710, the sensor package is utilized to obtain surface reconstruction data associated with a real world environment that adjoins the HMD device user.

In step 715, surface reconstruction data points are classified by height and, in step 720, placed into respective buckets where each bucket stores a different range of heights. For example, one bucket can include data points having heights between 0 and 20 cm, another bucket includes data points having heights between 20 and 40 cm, and so on. In step 725, a bucket that has a greatest number of data points that are below the height of the user is selected. In typical implementations, a predetermined threshold is applied when making the bucket selection so that the data points have some minimum vertical distance below the user's height which can improve real world floor identification in some cases.

In step 730, the height of the real world floor is identified based on the data points in the selected bucket. For example, the height of the real world floor may be identified by calculating an average of height values of the data points in the selected bucket. In step 735, the virtual floor height is aligned with that of the real world. Virtual world objects may also be aligned with the real world floor in step 740.

FIG. 8 is a flowchart of an illustrative method 800 that may be performed using the HMD device 104. In step 805, surface reconstruction data is generated using an HMD sensor package (e.g., sensor package 305) that can include a depth sensor or depth camera, for example. In step 810, surface reconstruction data points are sorted into a group (among a plurality of groups) according to vertical distance from the HMD device. Each group includes a different range of vertical distances. In step 815, the group having a greatest number of data points that exceed a threshold distance from the HMD device is selected. In step 820, a location of the real world floor is identified using the data points in the selected group, for example, by calculating an average of distance values of the data points.

In step 825, the HMD is operated to render a virtual world floor that is aligned with the identified location of the real world floor. In step 830, the location of the real world floor relative to the HMD device is dynamically identified as the user moves within the physical environment. For example, the real world may have floors at different heights, and the user may change head position by sitting, crouching, or performing other movements. In step 835, the virtual world floor is realigned in response to the dynamic identifying.

FIG. 9 is a flowchart of an illustrative method 900 that may be performed using the HMD device 104. Method 900 may provide an alternative way to identify the location of the real world floor in some implementations. In step 905, a point cloud of surface reconstruction data (e.g., point cloud 310 in FIG. 3) is obtained and a mesh of the physical environment in which the HMD device is located is generated in step 910. Typically, the mesh includes a plurality of vertices and triangular faces that are joined along edges of the mesh.

In step 915, a vertex in the mesh that has the lowest height relative to the HMD device is selected and a location of the floor of the physical environment is established at the height of the vertex in step 920. The virtual ground, which may have variable elevations, is dynamically adjusted, in step 925, to align with the location of the physical environment floor. Filtering and/or smoothing can be applied to the adjustments of the virtual ground in step 930.

Figure 10:
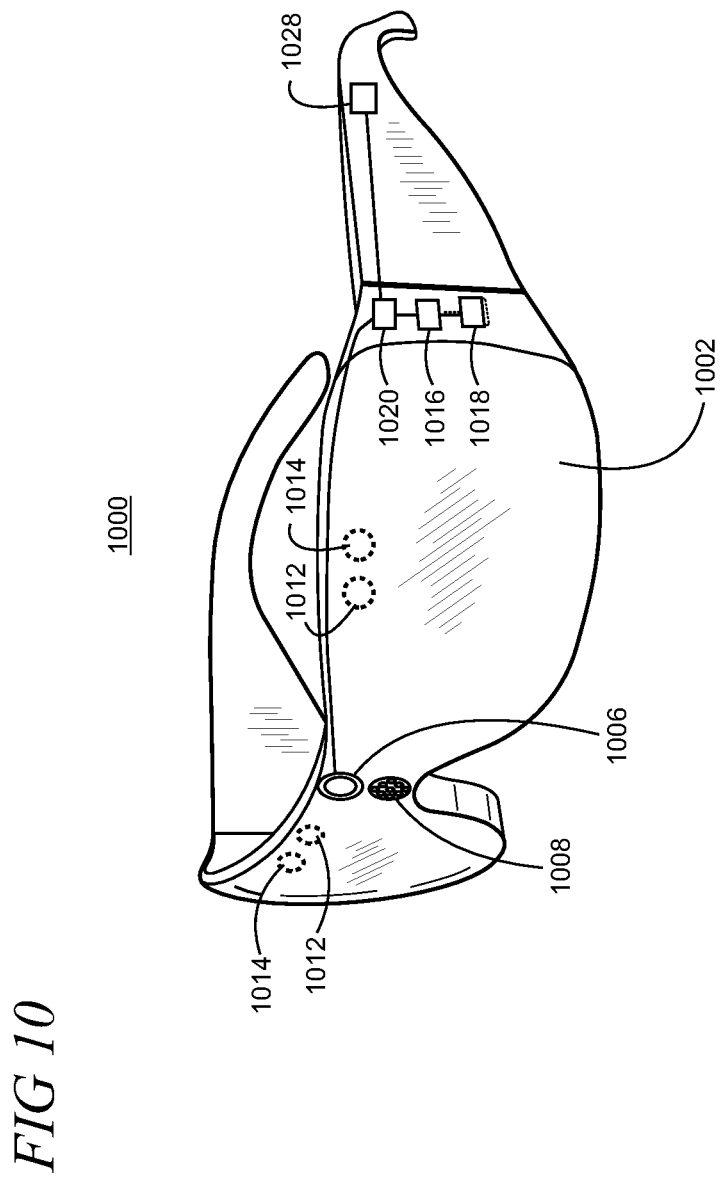
FIG. 10 is a pictorial view of an illustrative example of a virtual reality HMD device.
Figure 11:
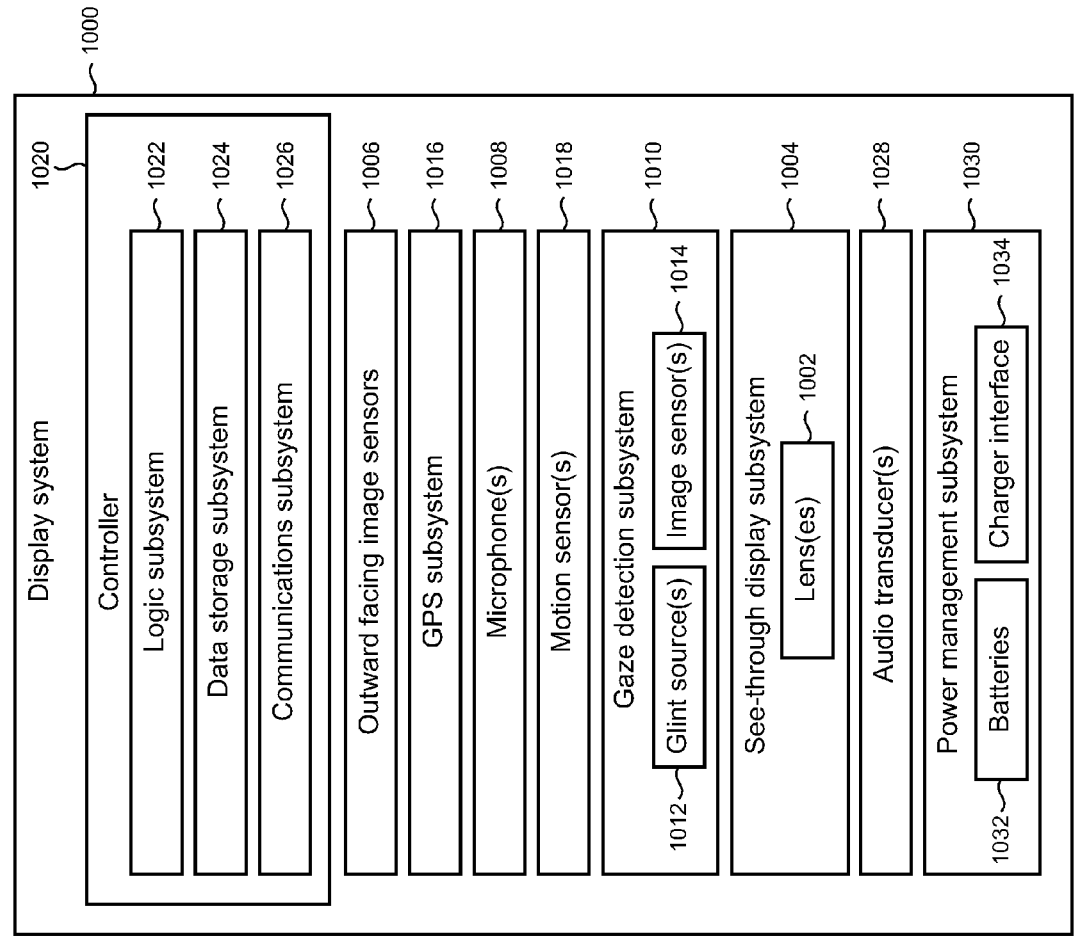
FIG. 11 shows a functional block diagram of an illustrative example of a virtual reality HMD device.
Figure 12:
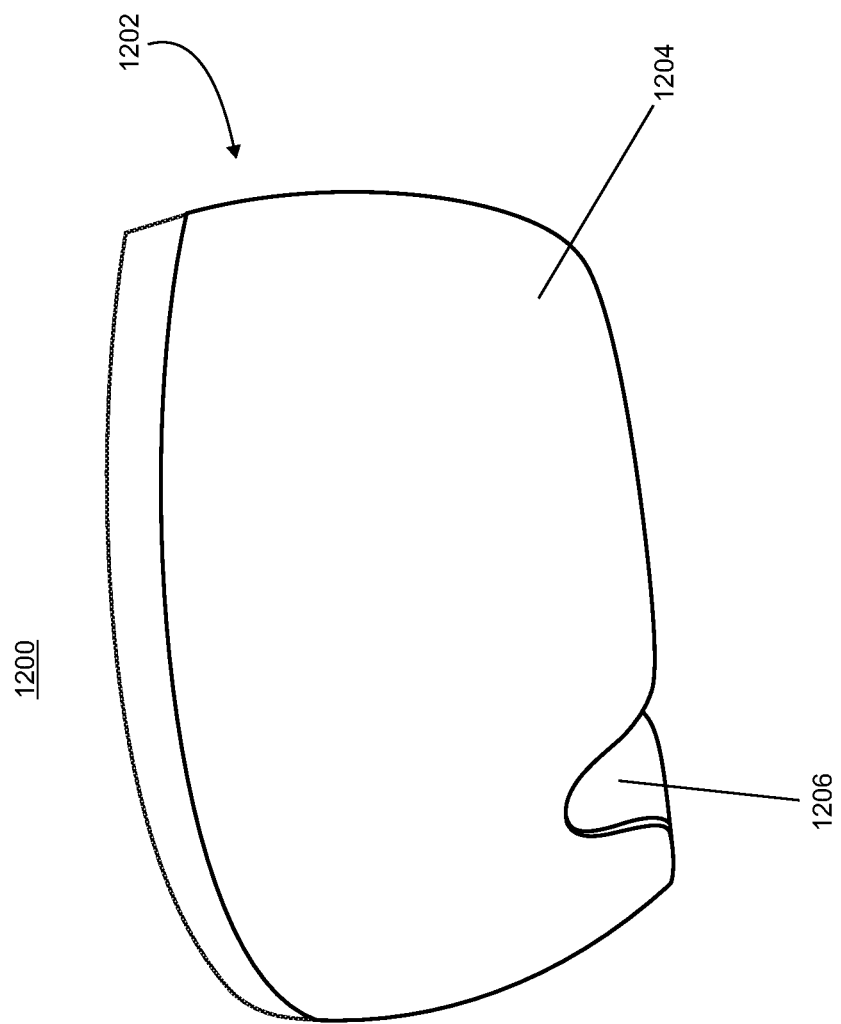
FIGS. 12 and 13 are pictorial front views of an illustrative sealed visor that may be used as a component of a virtual reality HMD device.
Figure 13:
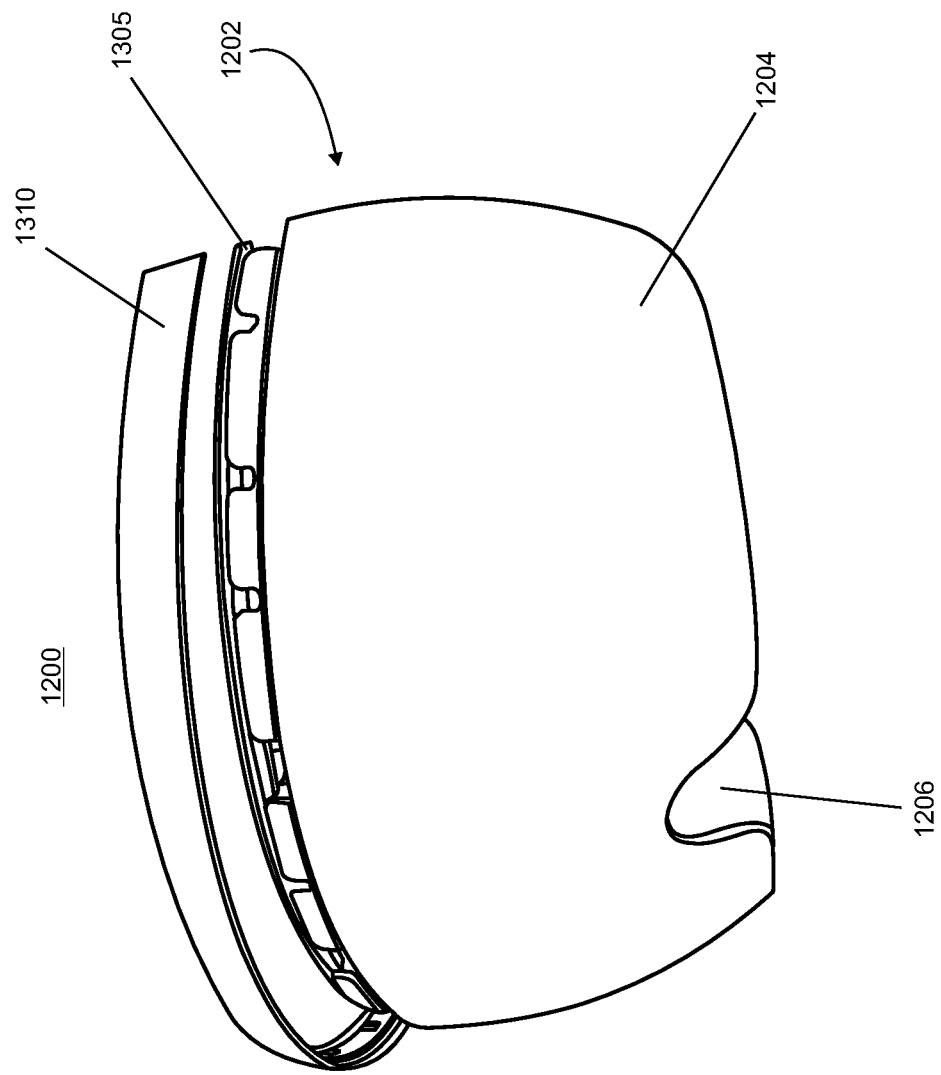

Turning now to various illustrative implementation details, a virtual reality or mixed reality display device according to the present arrangement may take any suitable form, including but not limited to near-eye devices such as the HMD device 104 and/or other portable/mobile devices. FIG. 10 shows one particular illustrative example of a see-through, mixed reality display system 1000, and FIG. 11 shows a functional block diagram of the system 1000. However, it is emphasized that while a see-through display may be used in some implementations, an opaque (i.e., non-see-through) display using a camera-based pass-through or outward facing sensor, for example, may be used in other implementations.

Display system 1000 comprises one or more lenses 1002 that form a part of a see-through display subsystem 1004, such that images may be displayed using lenses 1002 (e.g. using projection onto lenses 1002, one or more waveguide systems incorporated into the lenses 1002, and/or in any other suitable manner). Display system 1000 further comprises one or more outward-facing image sensors 1006 configured to acquire images of a background scene and/or physical environment being viewed by a user, and may include one or more microphones 1008 configured to detect sounds, such as voice commands from a user. Outward-facing image sensors 1006 may include one or more depth sensors and/or one or more two-dimensional image sensors. In alternative arrangements, as noted above, a virtual reality or mixed reality display system, instead of incorporating a see-through display subsystem, may display mixed reality images through a viewfinder mode for an outward-facing image sensor.

The display system 1000 may further include a gaze detection subsystem 1010 configured for detecting a direction of gaze of each eye of a user or a direction or location of focus, as described above. Gaze detection subsystem 1010 may be configured to determine gaze directions of each of a user's eyes in any suitable manner. For example, in the illustrative example shown, a gaze detection subsystem 1010 includes one or more glint sources 1012, such as infrared light sources, that are configured to cause a glint of light to reflect from each eyeball of a user, and one or more image sensors 1014, such as inward-facing sensors, that are configured to capture an image of each eyeball of the user. Changes in the glints from the user's eyeballs and/or a location of a user's pupil, as determined from image data gathered using the image sensor(s) 1014, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1010 may have any suitable number and arrangement of light sources and image sensors. In some implementations, the gaze detection subsystem 1010 may be omitted.

The display system 1000 may also include additional sensors. For example, display system 1000 may comprise a global positioning system (GPS) subsystem 1016 to allow a location of the display system 1000 to be determined. This may help to identify real world objects, such as buildings, etc. that may be located in the user's adjoining physical environment.

The display system 1000 may further include one or more motion sensors 1018 (e.g., inertial, multi-axis gyroscopic or acceleration sensors) to detect movement and position/orientation/pose of a user's head when the user is wearing the system as part of an augmented reality HMD device. Motion data may be used, potentially along with eye-tracking glint data and outward-facing image data, for gaze detection, as well as for image stabilization to help correct for blur in images from the outward-facing image sensor(s) 1006. The use of motion data may allow changes in gaze location to be tracked even if image data from outward-facing image sensor(s) 1006 cannot be resolved.

In addition, motion sensors 1018, as well as microphone(s) 1008 and gaze detection subsystem 1010, also may be employed as user input devices, such that a user may interact with the display system 1000 via gestures of the eye, neck and/or head, as well as via verbal commands in some cases. It may be understood that sensors illustrated in FIGS. 10 and 11 and described in the accompanying text are included for the purpose of example and are not intended to be limiting in any manner, as any other suitable sensors and/or combination of sensors may be utilized to meet the needs of a particular implementation of an augmented reality HMD device. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1000 can further include a controller 1020 having a logic subsystem 1022 and a data storage subsystem 1024 in communication with the sensors, gaze detection subsystem 1010, display subsystem 1004, and/or other components through a communications subsystem 1026. The communications subsystem 1026 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1024 may include instructions stored thereon that are executable by logic subsystem 1022, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1000 is configured with one or more audio transducers 1028 (e.g., speakers, earphones, etc.) so that audio can be utilized as part of an augmented reality experience. A power management subsystem 1030 may include one or more batteries 1032 and/or protection circuit modules (PCMs) and an associated charger interface 1034 and/or remote power interface for supplying power to components in the display system 1000.

It may be appreciated that the depicted display devices 104 and 1000 are described for the purpose of example, and thus are not meant to be limiting. It is to be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

FIGS. 12-16 show an illustrative alternative implementation for a virtual or mixed reality display system 1200 that may be used as a component of an HMD device. In this example, the system 1200 uses a see-through sealed visor 1202 that is configured to protect the internal optics assembly utilized for the see-through display subsystem. The visor 1202 is typically interfaced with other components of the HMD device (not shown) such as head mounting/retention systems and other subsystems including sensors, power management, controllers, etc., as illustratively described in conjunction with FIGS. 10 and 11. Suitable interface elements (not shown) including snaps, bosses, screws and other fasteners, etc. may also be incorporated into the visor 1202.

The visor includes see-through front and rear shields 1204 and 1206 respectively that can be molded using transparent materials to facilitate unobstructed vision to the optical displays and the surrounding real world environment. Treatments may be applied to the front and rear shields such as tinting, mirroring, anti-reflective, anti-fog, and other coatings, and various colors and finishes may also be utilized. The front and rear shields are affixed to a chassis 1305 as depicted in the partially exploded view in FIG. 13 in which a shield cover 1310 is shown as disassembled from the visor 1202.

The sealed visor 1202 can physically protect sensitive internal components, including an optics display subassembly 1402 (shown in the disassembled view in FIG. 14) when the HMD device is worn and used in operation and during normal handling for cleaning and the like. The visor 1202 can also protect the optics display subassembly 1402 from environmental elements and damage should the HMD device be dropped or bumped, impacted, etc. The optics display subassembly 1402 is mounted within the sealed visor in such a way that the shields do not contact the subassembly when deflected upon drop or impact.

Figure 14:
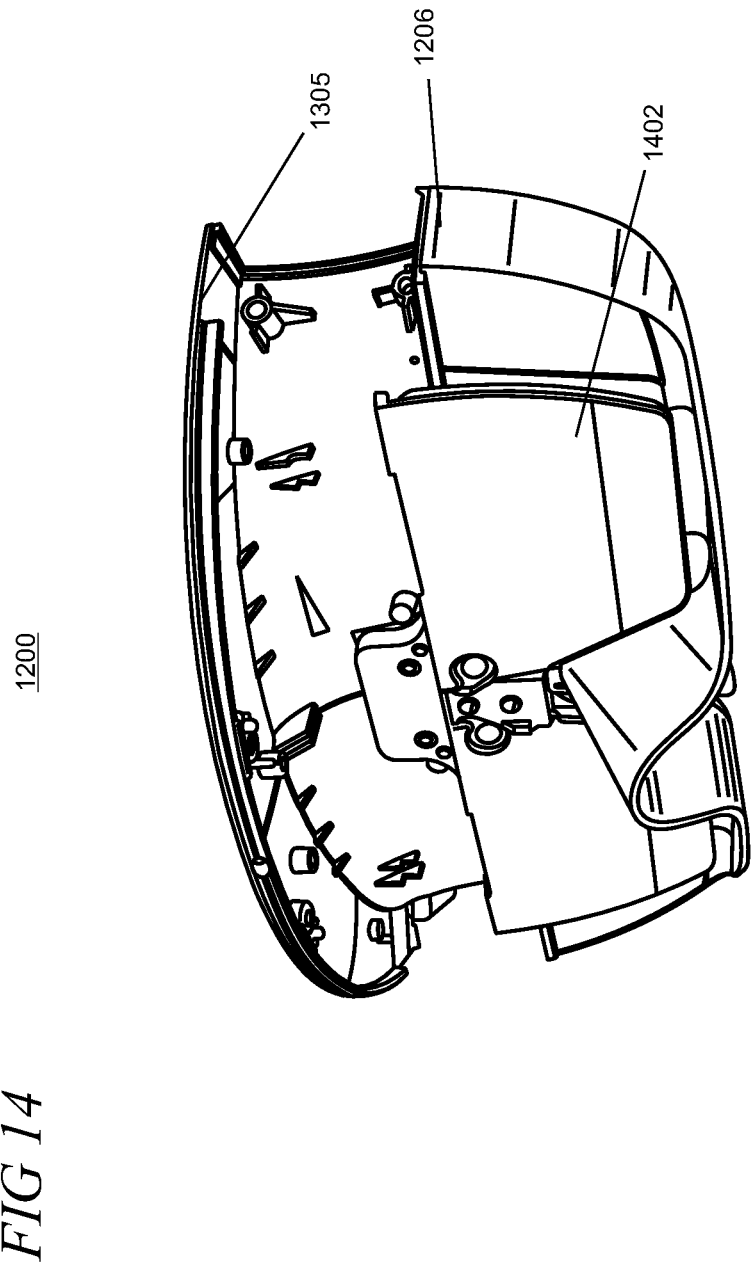
FIG. 14 shows a view of the sealed visor when partially disassembled.
Figure 15:
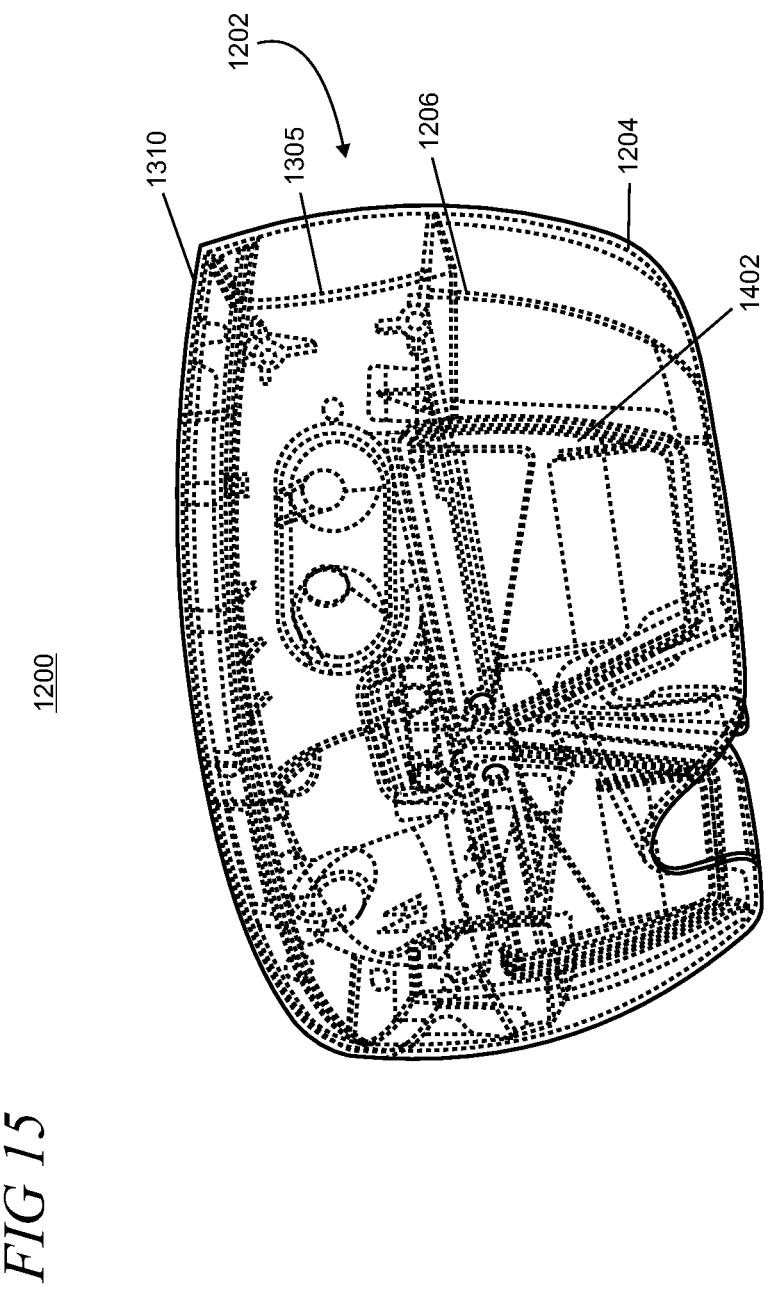
FIG. 15 shows a phantom line front view of the sealed visor.
Figure 16:
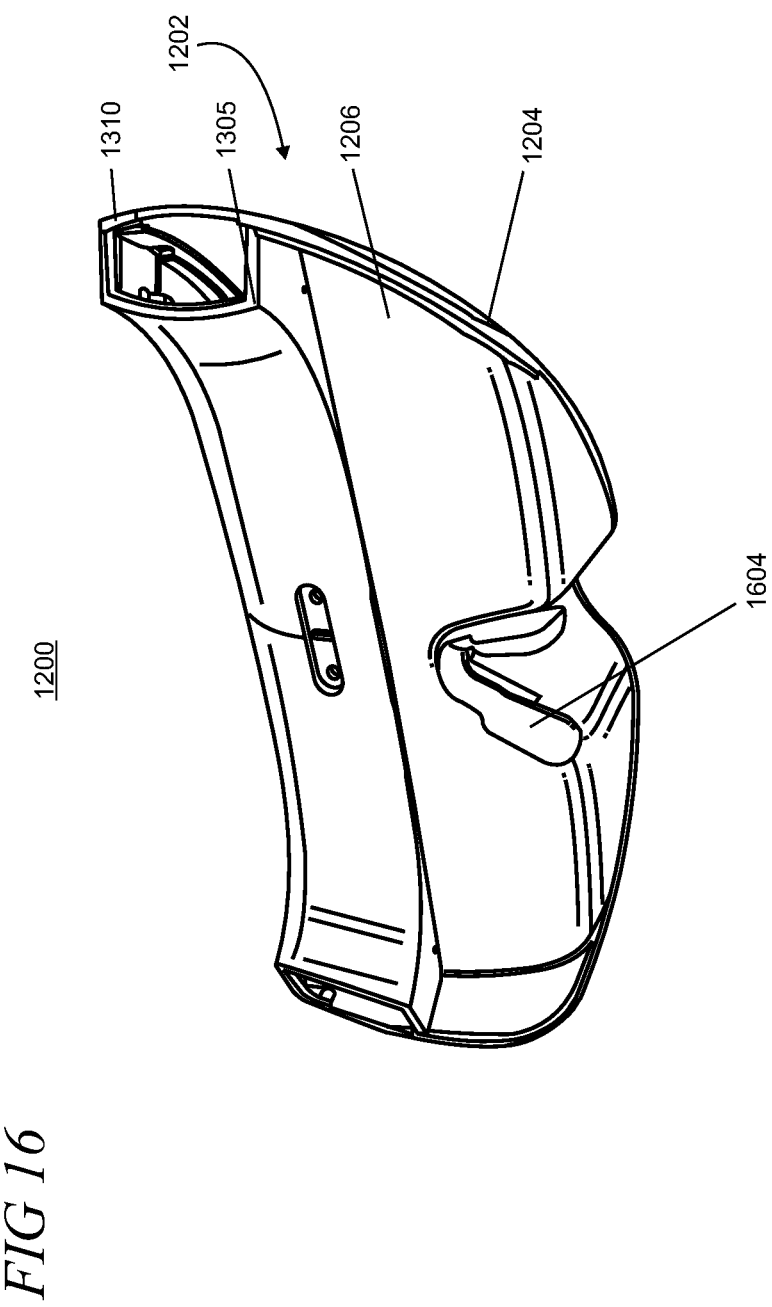
FIG. 16 shows a pictorial back view of the sealed visor.

As shown in FIGS. 14 and 16, the rear shield 1206 is configured in an ergonomically correct form to interface with the user's nose and nose pads 1604 (FIG. 16) and other comfort features can be included (e.g., molded-in and/or added-on as discrete components). The sealed visor 1202 can also incorporate some level of optical diopter curvature (i.e., eye prescription) within the molded shields in some cases.

Figure 17:
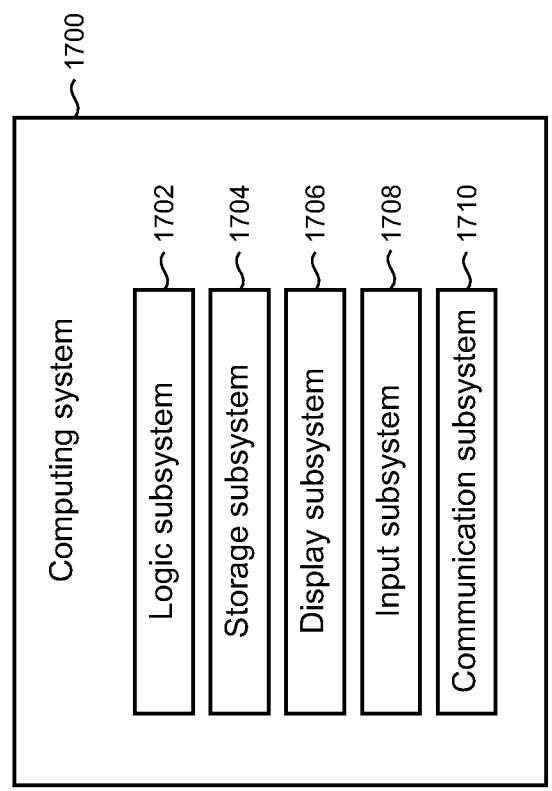
FIG. 17 shows an exemplary computing system.

FIG. 17 schematically shows a non-limiting embodiment of a computing system 1700 that can be used when implementing one or more of the configurations, arrangements, methods, or processes described above. The HMD device 104 may be one non-limiting example of computing system 1700. The computing system 1700 is shown in simplified form. It may be understood that virtually any computer architecture may be used without departing from the scope of the present arrangement. In different embodiments, computing system 1700 may take the form of a display device, wearable computing device, mainframe computer, server computer, desktop computer, laptop computer, tablet computer, home-entertainment computer, network computing device, gaming device, mobile computing device, mobile communication device (e.g., smart phone), etc.

The computing system 1700 includes a logic subsystem 1702 and a storage subsystem 1704. The computing system 1700 may optionally include a display subsystem 1706, an input subsystem 1708, a communication subsystem 1710, and/or other components not shown in FIG. 17.

The logic subsystem 1702 includes one or more physical devices configured to execute instructions. For example, the logic subsystem 1702 may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem 1702 may include one or more processors configured to execute software instructions. Additionally or alternatively, the logic subsystem 1702 may include one or more hardware or firmware logic machines configured to execute hardware or firmware instructions. The processors of the logic subsystem 1702 may be single-core or multi-core, and the programs executed thereon may be configured for sequential, parallel, or distributed processing. The logic subsystem 1702 may optionally include individual components that are distributed among two or more devices, which can be remotely located and/or configured for coordinated processing. Aspects of the logic subsystem 1702 may be virtualized and executed by remotely accessible, networked computing devices configured in a cloud-computing configuration.

The storage subsystem 1704 includes one or more physical devices configured to hold data and/or instructions executable by the logic subsystem 1702 to implement the methods and processes described herein. When such methods and processes are implemented, the state of the storage subsystem 1704 may be transformed—for example, to hold different data.

The storage subsystem 1704 may include removable media and/or built-in devices. The storage subsystem 1704 may include optical memory devices (e.g., CD (compact disc), DVD (digital versatile disc), HD-DVD (high definition DVD), Blu-ray disc, etc.), semiconductor memory devices (e.g., RAM (random access memory), ROM (read only memory), EPROM (erasable programmable ROM), EEPROM (electrically erasable ROM), etc.) and/or magnetic memory devices (e.g., hard-disk drive, floppy-disk drive, tape drive, MRAM (magneto-resistive RAM), etc.), among others. The storage subsystem 1704 may include volatile, nonvolatile, dynamic, static, read/write, read-only, random-access, sequential-access, location-addressable, file-addressable, and/or content-addressable devices.

It may be appreciated that the storage subsystem 1704 includes one or more physical devices, and excludes propagating signals per se. However, in some implementations, aspects of the instructions described herein may be propagated by a pure signal (e.g., an electromagnetic signal, an optical signal, etc.) using a communications medium, as opposed to being stored on a storage device. Furthermore, data and/or other forms of information pertaining to the present arrangement may be propagated by a pure signal.

In some embodiments, aspects of the logic subsystem 1702 and of the storage subsystem 1704 may be integrated together into one or more hardware-logic components through which the functionality described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

When included, the display subsystem 1706 may be used to present a visual representation of data held by storage subsystem 1704. This visual representation may take the form of a graphical user interface (GUI). As the present described methods and processes change the data held by the storage subsystem, and thus transform the state of the storage subsystem, the state of the display subsystem 1706 may likewise be transformed to visually represent changes in the underlying data. The display subsystem 1706 may include one or more display devices utilizing virtually any type of technology. Such display devices may be combined with logic subsystem 1702 and/or storage subsystem 1704 in a shared enclosure in some cases, or such display devices may be peripheral display devices in others.

When included, the input subsystem 1708 may include or interface with one or more user-input devices such as a keyboard, mouse, touch screen, or game controller. In some embodiments, the input subsystem may include or interface with selected natural user input (NUI) components. Such components may be integrated or peripheral, and the transduction and/or processing of input actions may be handled on- or off-board. Exemplary NUI components may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing components for assessing brain activity.

When included, the communication subsystem 1710 may be configured to communicatively couple the computing system 1700 with one or more other computing devices. The communication subsystem 1710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1700 to send and/or receive messages to and/or from other devices using a network such as the Internet.

Various exemplary embodiments of the present use of surface reconstruction data to identify real world floor are now presented by way of illustration and not as an exhaustive list of all embodiments. An example includes a method performed by a head mounted display (HMD) device to identify a height of a real world floor, the HMD device supporting rendering of a virtual or mixed reality environment, the method comprising: obtaining surface reconstruction data associated with a real world environment adjoining a user of the HMD device; classifying surface reconstruction data points by height; sorting the classified data points into respective buckets; selecting a bucket having a greatest number of data points that are below a height of the user; and identifying a height of the real world floor relative to the user based on the data points in the selected bucket.

In another example, the surface reconstruction data includes depth data and the method further includes generating the surface reconstruction data using a depth sensor and applying surface reconstruction techniques to reconstruct the real world environment geometry. In another example, the method further includes generating depth data using one or more depth-from-stereo imaging analyses. In another example, the method further includes aligning a height of a virtual world floor with the height of the real world floor. In another example, the method further includes aligning a virtual world object to the real world floor. In another example, the surface reconstruction data is captured using a sensor package in the HMD device, the sensor package including a depth sensor or depth camera. In another example, the method further includes configuring the HMD device to expose a user interface (UI) to the user and prompting the user, through the UI, to stand and look down. In another example, the method further includes determining the height of the user utilizing surface reconstruction data that is captured when the user looks down. In another example, the method further includes selecting a bucket that is below the user's height by some predetermined threshold. In another example, the method further includes calculating an average of height values of data points in the selected bucket to determine the height of the real world floor.

A further example includes a head mounted display (HMD) device operable by a user in a physical environment having a real world floor, comprising: one or more processors; a sensor package; a display for rendering a virtual reality environment to the user; and one or more memory devices storing computer-readable instructions which, when executed by the one or more processors, perform a method comprising the steps of: i) generating surface reconstruction data for the physical environment using the sensor package, ii) using the surface reconstruction data to identify a location of the real world floor relative to the HMD device by a) sorting surface reconstruction data points into a group among a plurality of groups according to vertical distance from the HMD device, each group in the plurality of groups covering a different range of vertical distances, b) selecting a group having a greatest number of data points that exceed a threshold vertical distance from a current position of the HMD device, c) identifying a location of the real world floor relative to the HMD device based on the data points in the selected group, and iii) operating the HMD device to render the virtual reality environment on the display so that the virtual world floor is aligned with the identified location of the real world floor.

In another example, the HMD device further includes calculating an average of values of data points in the selected group to identify the location of the real world floor relative to the HMD device. In another example, the HMD device further includes modeling the physical environment using a surface reconstruction data pipeline that implements a volumetric method creating multiple overlapping surfaces that are integrated. In another example, the HMD device further includes a sealed protective visor that substantially encases the display. In another example, the HMD device further includes dynamically identifying the location of the real world floor relative to the HMD device as the user traverses the physical environment. In another example, the HMD device further includes realigning the virtual world floor with the real world floor responsively to the dynamic identifying.

A further example includes one or more computer readable memories storing computer-executable instructions for rendering a virtual or mixed reality environment having variable elevations of virtual ground on a head mounted display (HMD) device located in a physical environment having a floor, the method comprising the steps of: obtaining a point cloud of surface reconstruction data; generating a mesh of the physical environment from the point cloud, the mesh including a plurality of vertices and faces; selecting a vertex in the mesh having a height that is lowest relative to the HMD device; and establishing a location of the floor of the physical environment at the height of the selected vertex.

In another example, the one or more computer readable memories further include performing an adjustment of the virtual ground to align with the location of the floor of the physical environment. In another example, the adjustment is performed dynamically as a vertical adjustment. In another example, the one or more computer readable memories further include filtering or smoothing the dynamic vertical adjustment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method performed by a head mounted display (HMD) device to identify a height of a real world floor, the

HMD device supporting rendering of a virtual or mixed reality environment, the method comprising:
  obtaining surface reconstruction data associated with a real world environment adjoining a user of the HMD device;
  classifying surface reconstruction data points by height;
  sorting the classified data points into respective buckets;
  selecting a bucket having a greatest number of data points that are below a height of the user; and
  identifying a height of the real world floor relative to the user based on the data points in the selected bucket.

2. The method of claim 1 in which the surface reconstruction data includes depth data and further including generating the surface reconstruction data using a depth sensor and applying surface reconstruction techniques to reconstruct the real world environment geometry.

3. The method of claim 1 further including generating depth data using one or more depth-from-stereo imaging analyses.

4. The method of claim 1 further including aligning a height of a virtual world floor with the height of the real world floor.

5. The method of claim 1 further including aligning a virtual world object to the real world floor.

6. The method of claim 1 in which the surface reconstruction data is captured using a sensor package in the HMD device, the sensor package including a depth sensor or depth camera.

7. The method of claim 1 further including configuring the HMD device to expose a user interface (UI) to the user and prompting the user, through the UI, to stand and look down.

8. The method of claim 1 further including determining the height of the user utilizing surface reconstruction data that is captured when the user looks down.

9. The method of claim 1 further including selecting a bucket that is below the user's height by some predetermined threshold.

10. The method of claim 1 further including calculating an average of height values of data points in the selected bucket to determine the height of the real world floor.

11. A head mounted display (HMD) device operable by a user in a physical environment having a real world floor, comprising:
  one or more processors;
  a sensor package;
  a display for rendering a virtual reality environment to the user; and
  one or more memory devices storing computer-readable instructions which, when executed by the one or more processors, perform a method comprising the steps of:
    i) generating surface reconstruction data for the physical environment using the sensor package,
    ii) using the surface reconstruction data to identify a location of the real world floor relative to the HMD device by
      a) sorting surface reconstruction data points into a group among a plurality of groups according to vertical distance from the HMD device, each group in the plurality of groups covering a different range of vertical distances,
      b) selecting a group having a greatest number of data points that exceed a threshold vertical distance from a current position of the HMD device,
      c) identifying a location of the real world floor relative to the HMD device based on the data points in the selected group, and
    iii) operating the HMD device to render the virtual reality environment on the display so that the virtual world floor is aligned with the identified location of the real world floor.

12. The HMD device of claim 11 further including calculating an average of values of data points in the selected group to identify the location of the real world floor relative to the HMD device.

13. The HMD device of claim 11 further including modeling the physical environment using a surface reconstruction data pipeline that implements a volumetric method creating multiple overlapping surfaces that are integrated.

14. The HMD device of claim 11 further including a sealed protective visor that substantially encases the display.

15. The HMD device of claim 11 further including dynamically identifying the location of the real world floor relative to the HMD device as the user traverses the physical environment.

16. The HMD device of claim 15 further including realigning the virtual world floor with the real world floor responsively to the dynamic identifying.

17. One or more computer readable memories not consisting of propagated signals storing computer-executable instructions for rendering a virtual or mixed reality environment having variable elevations of virtual ground on a head mounted display (HMD) device located in a physical environment having a floor, the method comprising the steps of:
  obtaining a point cloud of surface reconstruction data;
  generating a mesh of the physical environment from the point cloud, the mesh including a plurality of vertices and faces;
  selecting a vertex in the mesh having a height that is lowest relative to the HMD device; and
  establishing a location of the floor of the physical environment at the height of the selected vertex.

18. The one or more computer readable memories of claim 17 further including performing an adjustment of the virtual ground to align with the location of the floor of the physical environment.

19. The one or more computer readable memories of claim 18 in which the adjustment is performed dynamically as a vertical adjustment.

20. The one or more computer-readable memories of claim 19 further including filtering or smoothing the dynamic vertical adjustment.

* * * * *